Nov. 2, 1965   E. J. SINNOTT   3,215,577
PROCESS FOR PRODUCING INSULATION TAPE
Filed Oct. 16, 1963   3 Sheets-Sheet 1
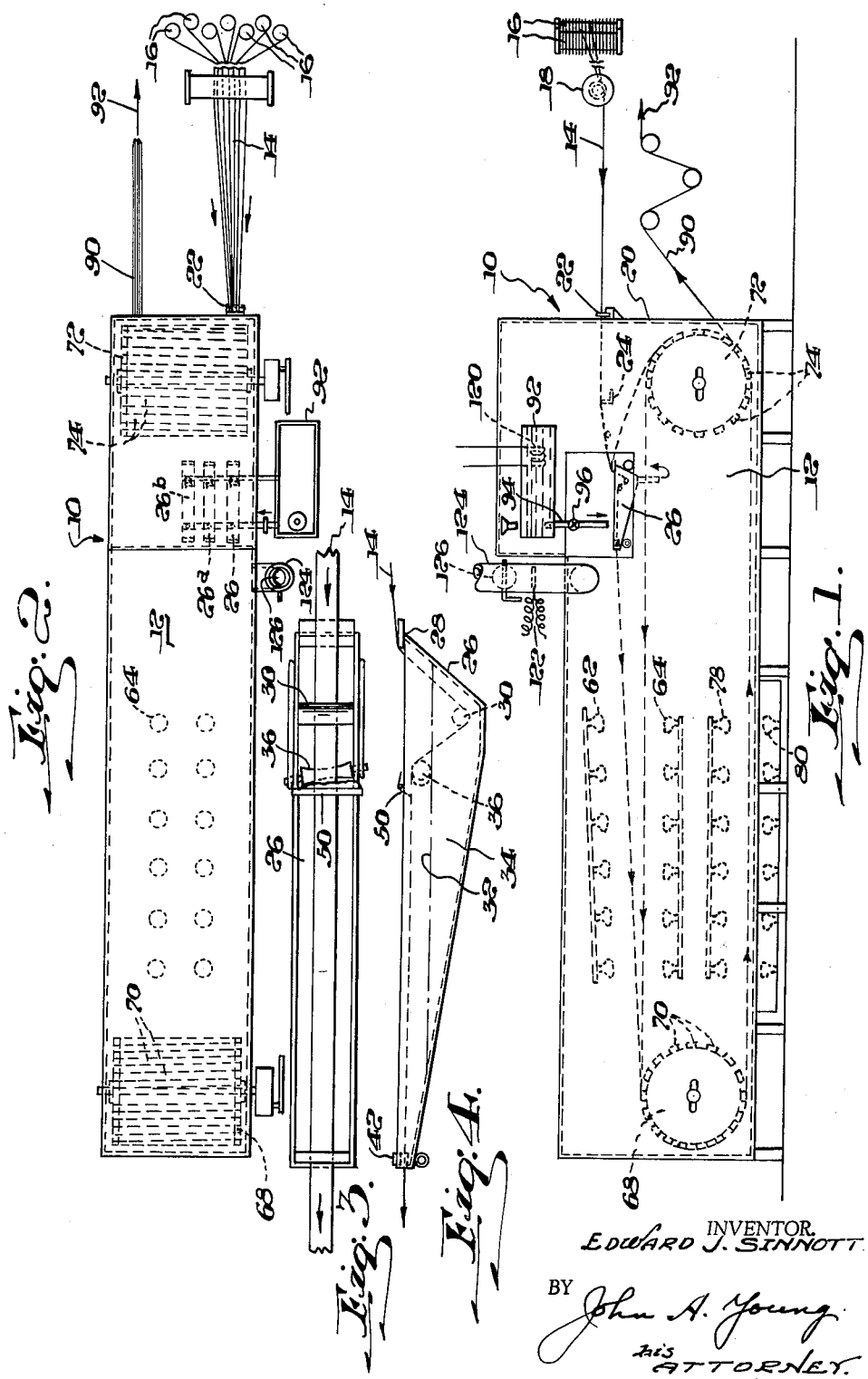
INVENTOR.
EDWARD J. SINNOTT
BY John A. Young
his ATTORNEY.

Nov. 2, 1965  E. J. SINNOTT  3,215,577
PROCESS FOR PRODUCING INSULATION TAPE
Filed Oct. 16, 1963  3 Sheets-Sheet 2

INVENTOR.
EDWARD J. SINNOTT.
BY John A. Young
his ATTORNEY.

Nov. 2, 1965       E. J. SINNOTT       3,215,577
PROCESS FOR PRODUCING INSULATION TAPE
Filed Oct. 16, 1963                    3 Sheets-Sheet 3

INVENTOR.
EDWARD J. SINNOTT.
BY John A. Young
his ATTORNEY

United States Patent Office 3,215,577
Patented Nov. 2, 1965

3,215,577
PROCESS FOR PRODUCING INSULATION TAPE
Edward J. Sinnott, Monroeville, Pa., assignor to Reinforced Molding Corporation, Monroeville, Pa., a corporation of Pennsylvania
Filed Oct. 16, 1963, Ser. No. 316,769
3 Claims. (Cl. 156—166)

This invention relates to both apparatus and process for producing insulation tape from a combination of glass rovings (or monofilaments) and a suitable resin binder.

It has been known to employ a tape comprised of resin bonded glass filaments to bind the field windings in a generator or motor, such applications have now become generally accepted in the art as preferred construction expedients. Suitable resins having the correct electrical properties are now generally available, and glass fibers are similarly available having a degree of strength such that a combination of the two materials is within the skill of the art. For example, reference may be made to prior art teachings such as Coggeshall Patent No. 2,747,118 and Loritsch 2,528,235, which are typical of resin materials and tape constructions. These are illustrations of background information, but without in any way implying that the present invention is limited to these expedients in practicing the invention.

In spite of the fact that tape materials have been gaining acceptance in the motor and generator arts, resin-bonded glass filament tapes are still lacking in important respects because of the tendency of these materials to have non-uniform strength and electrical properties and are of variable resin/glass fiber ratio. It will be appreciated that, in order for the tape material to be of optimum use, it must be a reliable product, meaning that its strength must be of accurate predictable properties and it must be uniform throughout its length in order to take advantages of the materials of construction. For example, glass fibers which are drawn into filaments are noteworthy for their tensile strength and the resin material serves to hold the strands in place whereby such tensile strength properties are realized and both possess suitable electrical insulation properties. Nevertheless, because of the substantial length to width ratio of the product, it is essential to the proper manufacturing and operation of the tape material that there be as uniform ratio as possible for the resin-to-glass fibers throughout the length of the product, otherwise the material is substantially less useful as an end product.

It is one of the objects of the present invention, to provide an accurately sized tape material, i.e., a material having an accurately dimensioned width and thickness for the tape material so produced.

A further object of the present invention, is to produce a tape material which is of uniform strength and physical properties, including electrical resistance properties, to provide a product having the necessary strength and insulation properties for use.

It is a further object of the present invention, to provide a new and improved apparatus and process for producing a tape material which is substantially solventless, comprised of glass filaments and uncured plastic material so that it can be readily wound around the end coils of armatures or the like and thereafter heated to polymerize the tape material to a final condition.

A still further object of the present invention is to provide a new and improved apparatus and process for producing tape material having such important features as an improved method for applying the resin material which forms the coating for the filaments; a new and improved method for deploying heating elements within the apparatus so as to uniformly heat the opposite sides of the tape material and maintain the resin at a substantially constant viscosity as well as obtaining a substantially uniform heating action on the coated fiber glass strands to remove the solvent; and improved means for adjusting and setting up the apparatus to provide for location of the various parts for dipping, sizing and heating to produce the laminations of resin material on the fiber glass strands in order to produce the desired dimension and weight ratios which must be accurately and precisely formed for proper results.

A further object of the present invention, is to provide a novel apparatus which lends itself to continuous and substantially trouble-free operation whereby tape material can be produced of parallel side-by-side filaments having the requisite resin material to produce an accurately formed product and under a substantially constant degree of tension. One of the important features of the present invention lies in the provision of means for accurately guiding the tape material as it moves successively through the coating, heating, recoating and resizing steps so that the successive resin coatings are accurately applied to the material and the finished product is of uniform strength having predictable uniform physical properties throughout its length.

Other objects and features of the present invention will become apparent from a consideration of the following description, which proceeds with reference to the accompanying drawings, wherein:

FIGURE 1 is a side elevational view of the apparatus illustrating the line of travel of the filaments through the heating chamber, the disposition of heating elements and coating reservoirs or tanks;

FIGURE 2 is a top view of the apparatus of FIGURE 1, looking downwardly in FIGURE 1;

FIGURES 3 and 4 are top and side views, respectively, of the reservoirs for containing the liquid phase resin material;

Figure 5:
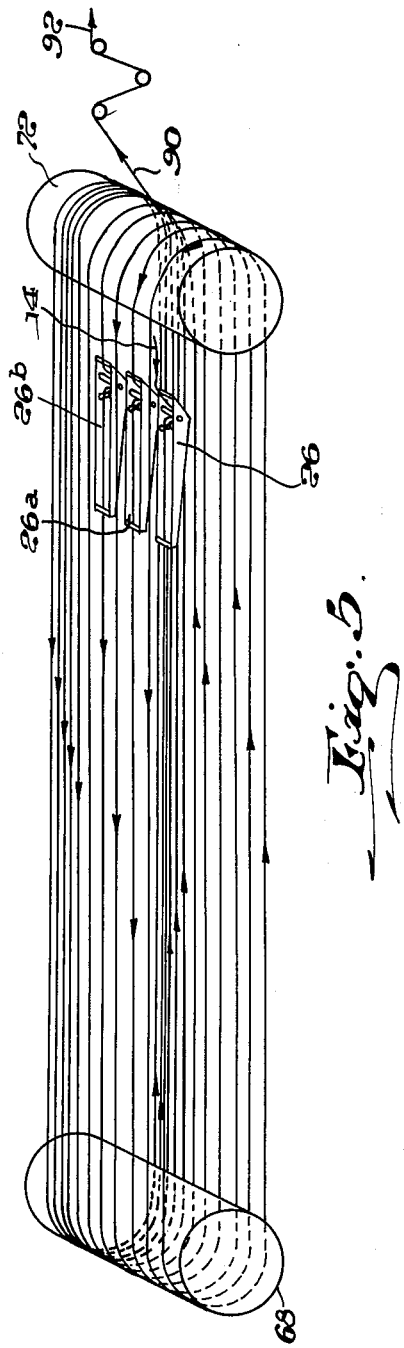
FIGURE 5 is a schematic view showing how the tape is passed over the end rolls at the opposite ends of the apparatus illustrating the direction of travel of the filaments and location of reservoirs.

Referring now to the drawings, the apparatus, designated generally by reference numeral 10, includes a chamber 12 into which is fed a plurality of strands or monofilaments 14 of glass from creels 16, the strands being passed first over a tensioning device 18. At the inlet end 20 of chamber 12 is a comb 22 which gathers the filaments 14 (FIGURE 2) and draws them together to approximately the width dimension of the tape. Next, filaments 14 pass over a stationary guide surface 24 which, owing to the tension of the filaments 14, tends to draw the filaments even closer together.

Directly in line of the travel of the filaments, is a reservoir or tank 26 with a guide flange 28 at the inlet end thereof and a roller 30 which is submerged below the level 32 of a liquid phase resin material 34 so that the strands or monofilaments pass below the surface of the resin and then pass over control roller 36 which is tapered (FIGURE 3) and journalled on a bias (FIGURE 3) so as to wipe off excess resin from the bottom surface of the tape material, the rolling action serving to work the resin material uniformly throughout the thickness of the tape and fill all of the voids or spaces between adjacent filaments 14. The angularity of the roll 36 (FIGURE 3)

serves to orient the line or direction of movement of the tape in a lateral sense, a direction transversely to the line of longitudinal movement of the product which is now in the form of a tape after having gathered the monofilaments in side by side relation and after their having received a coating of resin material.

Figure 6:
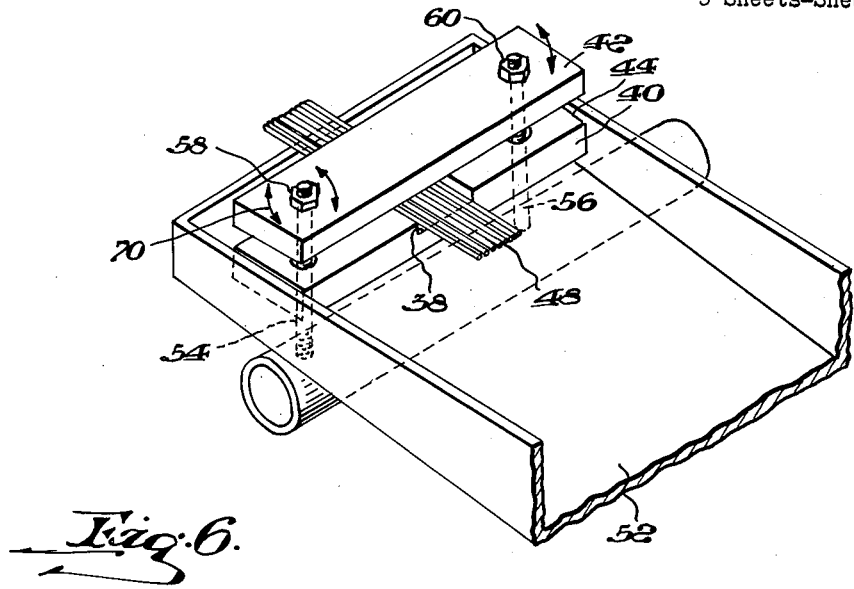
FIGURE 6 is an enlarged detail view of the means defining the orifice by which the tape is sized as it leaves the resin reservoir, such means being floatable to conform with the line of travel of the tape material; and, FIGURE 7 illustrates, schematically, the means whereby the resin reservoirs are maintained at a suitable level with liquid phase resin material during operation of the apparatus.

As the coated resin reaches the end of container 26 it is passed through a notch 38 of a die block 40 having a companion die block 42 with a flat face 44, the two die blocks being clamped together so that the tape passes through the accurately sized notch 38 and accurately defines the thickness of the resin-and-strands emerging from between the two dies 40, 42 (FIGURE 6). The accurately dimensioned notch 38 controls both the thickness and width of the tape. Prior to reaching the die, however, the upper surface 48 is lightly scraped of a substantial part of the excess resin by a wiper blade 50 so that by the time the coated monofilaments which have now assumed the shape of a "tape" have reached the die blocks, the major portion of the excess resin has already been removed. Such remaining excess resin, however, as removed at the inlet end of the die blocks 40, 42, runs downwardly and, by reason of the inclined surface 52 (FIGURE 6) of the tank 26, drains backwardly to the main body of resin for reapplication and does not merely collect, in dried portions which would otherwise have the effect of scoring or marring the surface of the coated filaments.

In order for the die blocks to achieve maximum benefit, the orifice or notch 38 should be accurately aligned with the line of travel of the filaments. This is obtained by allowing the mounting bolts 54, 56 and their respective companion nuts 58, 60 which are mounted at the threaded ends thereof, to be sufficiently loose so that with respect to the line of travel of the tape, the two die blocks can pivot, limitedly, in the direction of the arrows 70 to align themselves more precisely with the line of travel of the tape. The described action is achieved by merely loosening the nuts 58, 60 and allowing the die blocks to adjust themselves to whatever position dictated by the tape as it travels through the notch 38 and after the tape iself positions the die blocks, the nuts 58, 60 are then turned down to hold this position thereafter. Thus, the tape is itself used to locate the die blocks accurately along the line of travel of the tape and without scraping the tape or bottom surfaces or opposite edges of the tape and thereby crossing one strand over the other to weaken the tape material. It is, of course, essential to achieve the correct sizing of the fibers or monofilaments but without crossing the filaments one over the other so that they will rasp against each other. The funtion of the dies is to size the product, but without disrupting the product or scraping excess of resin off of any one given surface including the edges and the upper and lower surfaces; this occurs most ideally when the sizing orifice is accurately aligned with the line of travel, this being achieved by first floating the two die members as described and allowing them to take a position dictated by the line of travel of the tape and thereafer clamping the dies in such position.

The tape, after leaving the dies, then travels between a first pair of upper and lower lamps 62, 64 which simultaneously apply radiant heat to the opposite faces of the tape, removing the solvent at a rate which renders the resin substantially solventless but in the process of removal, does not produce voids or internal discontinuities of the resin. By simultaneously applying heat to both sides of the tape, the solvent removal is substantially uniform and the product produced tends to be of uniform value. At the end of the chamber is a first drum 68 having slabs 70 which are at a slight skew angle (FIGURE 2) to the line of travel of the tape to produce the effect of indexing or laterally moving the tape as it changes direction by passing over the drum 68, moving at one time along the bottom of the chamber (FIGURE 1) and then passing over drum 72 which also has slats 74 at a slight skew angle and again tending to index the tape laterally within the chamber 12.

A second set of heating elements in the form of pairs of infrared lamps 78, 80 imparts a heating effect to the opposite sides of the tape as it passes therebetween again, uniformly heating the opposite faces of the tape and maintaining the tape at a suitable temperature whereby the viscosity of the resin, the thickness of coating and the uniformity of the coating is more accurately obtained.

Successive coatings are obtained by additional containers 26A, 26B, 26C. Between successive applications, however, the tape is exposed to the heating elements sufficiently to remove the solvent from the next preceding coating, this being achieved by coordinating the speed of linear travel of the tape, together with the length of the chamber 12 and intensity of the pairs of heating elements 64, 62 and 78, 80. The successive coating operations are each effective, in combination with a light surface scraping, followed by an accurate sizing from properly located die elements to produce the desired build up of resin to the right amount.

It is better to achieve the described sizing by successive laminations and heatings than with a single thick lamination and heating because solvent removal takes place through thinner increments with less likelihood of disrupting the cross sectional thickness of the product.

Following the last coating operation, the tape is moved for a desired number of passes between the ends of the chamber by passing first over one and then the other of the drums 68, 72 which in turn exposes the tape for a sufficient period of time to the heating action of the pairs of heating elements 64, 62, 78–80 and the product is rendered substantially solventless. The accurately sized and solvent free product then passes from the chamber 12 (FIGURE 2) as indicated by product 90, moving in the direction indicated by reference numeral 92, to a wind-up reel (not shown) but which turns at a rate of speed insuring a substantially constant tension on the product, the wind-up reel being the source of draft for the entire movement of the product throughout the chamber and including the initial stripping of the filaments from the creels 16. The product is thus caused to move under constant tension throughout the apparatus and this constant tension, prevents the edges from curling up or otherwise distorting the product from edge to edge and causes it to lie flat against the windup reel, which may include, separation or "release" layers between adjacent tape windings so that the product will not stick together. The material is now ready for winding on the end coils of the motor or generator and subsequent baking to polymerize the resin material.

In operation, the glass filaments are provided in substantially constant length and the filaments are preheated to about 125 to 150° F. The uniformity of the product, is obtained by reason of a number of different factors, all of which contribute to the uniformity of the product and any one of which, if deleted, would impair or compromise the uniformity of the product.

Figure 7:
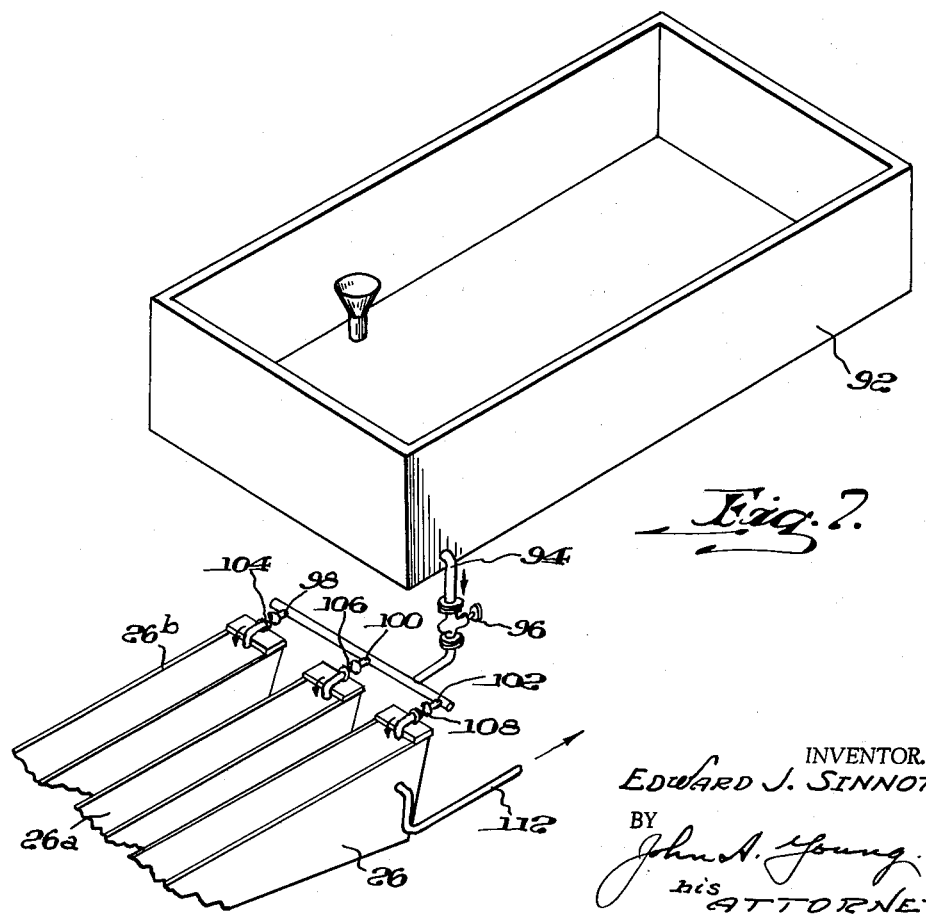

The constant tension of the monofilaments passing through comb 22 and tensioning devices 18 causes the monofilaments to move accurately into near-tangent relation and the constant viscosity of the resin material within the container 26 insures a substantially uniform coating which is worked between the contiguous filaments and produces a substantially uniform coating thereon, by reason of the rolling contact between the control roller 36 and the undersurface of the filaments after they pass through the liquid resin material 34. The liquid resin material is maintained under substantially constant viscosity by being supplied from a reservoir 92 (FIGURE 7) through an outlet or feed conduit 94 and valve 96 with manifold outlets 98, 100 and 102, each with its respective valve 104, 106, 108 leading to the tanks 26, 26A, 26B. An overflow is provided for each of the tanks, as for example shown by conduit 112 leading back to 92. The resin in 92 is heated in some suitable manner to maintain the product at a desired viscosity.

Initially, the two die blocks 40, 42 are free to adjust themselves to become aligned with the line of travel of the tape and thus, while effecting its sizing operation, but nevertheless producing minimal scraping of the edges as well as the upper and lower surfaces of the tape. Once the loosely or floatably mounted die blocks position themselves by moving the tape therethrough, the bolts 58, 60 are then turned down to securely clamp the die blocks in place and the tape-producing operation is then commenced.

The initial resin removal takes place at the control roller 36 which works the resin into the tape and also tends to guide the tape into alignment with the inlet end of the sizing orifice 38 and the upper end of the tape is lightly scraped of excess resin by the wiper 50. The final resin removal is achieved, however, at the inlet end of the orifice or notch 38 and such excess removed resin falls against the inclined surface 52 and drains back for further application. The tape continues to travel past the heating lamps which are provided in pairs to exert heating action against the opposite faces of the tape both at the upper and lower end of the heating chamber 12, the spot temperatures being in the vicinity of the heating elements in the order of 170° F. The longitudinal, back and forth movement of the tape, first over 68 and then over drum 73 produces convection currents which tend to heat uniformly all portions of the chamber 12 both by radiation from the tape and also by producing convection currents while the tape maintains its temperature, it will coat better with the resin and it has been found that if the chamber 12 is more uniformly heated, the product produced will vary less in cross sectional thickness. The invention thus comprehends, a more constant temperature, a more constant viscosity of the resin to achieve the greater uniformity of weight control and resin weight glass fiber ratio. It is, of course, important to obtain a precise control of the resin to glass fibers to achieve optimum electrical properties for the material.

Although each user dictates the optimum resin to tape ratio, typically there is provided the resin is about 20% to 30% by weight of the finished tape with the solvent removed, i.e., with the product applied to the end coils of the armature or motor. The tape is generally applied to the armature under about 500 pounds tension and if the tape is non-homogeneous, i.e., too high or too low in resin content, it will produce an unsatisfactory product. The speed of the filaments passing through the chamber 12 is not critical, the critical factor being the speed in relation to the length of the chamber, which dictates the time during which the tape is exposed to temperatures to remove the solvent. The speed of processing is matched to length dimensions and temperatures so that between successive coating operations, the solvent is essentially completely removed. Also, the tension under which the filaments are drawn through the apparatus is non-critical except that each of the filaments should be under substantially the same tension and the tension should not vary greatly from the time the filaments are drawn off of the creel to the time of wind-up of the finished tape in order to prevent curling of the edges and to prevent cross over of the filaments and maintain their same relative positions through the process.

By providing a constant or nearly constant temperature on opposite sides of the tape by means of the heating element 64-62, 78-80, the solvent is more effectively removed without changing the cross sectional uniformity of the tape and, because of the more even viscosity of the resin, together with the "working in" by the roller 36, blade 50 and orifice 38, the ratio of resin to glass fibers is more accurately controlled and the thickness of the products is more accurately controlled. The incidence of scraping the edges in producing damage to this portion of the tape is effectively obviated by initially floating the dies 40, 42 so that they will automatically assume the correct position in relation to the longitudinally traveling tape. For different ratios of resin to fiber glass, it is possible to replace the die 40 with whatever size notch 38 is desired to achieve the resin/fiber glass ratio requested for a given application. Also, the direction of the coated fibers is accurately taken in advance of the orifice by controllably canting the control roller 36 (FIGURE 3). It is of course, possible to vary the placement, number and intensity of the heating lamp 64-62 and 78-80 there being typically a plurality of opposed sets of lamps in the order of about 2-50 sets of lamps at the top and bottom of the heating chamber. The dip tanks 26 are maintained filled to a level 32, at all times by the feed reservoir 92 and its viscosity is maintained substantially constant by heating elements associated with the reservoir 92, the excess resin being returned quickly to the main body of the material so as not to vary the solvent content. Also, the coating is effected by completely immersing the fibers so that the surface tension of the resin plays little or no role.

In operation, there are many different resin materials which can be used, a typical resin material being one of the following compositions: (1) a polymerizable unsaturated alkyd resin obtained by the esterification reaction of a mixture of ingredients comprising a polyhydric alcohol and an alpha unsaturated alpha-beta polycarboxylic acid, e.g., diethylene glycol maleate; (2) a copolymerizable different monomer, e.g., styrene, polyesters compatible with the above unsaturated alkyl resin obtained by esterification of allyl alcohol with a polybasic acid, specifically a polycarboxylic acid, e.g., diallyl phthalate, etc., in the ratio, by weight, of about 1 part to 1 to 3 parts of (1); (3) a catalyst for accelerating the copolymerization of the ingredients of (1) and (2), e.g., benzoyl peroxide; (4) a polyvinyl acetal resin, specifically a polyvinyl formal resin, in an amount corresponding to from about 15 to 75 percent, by weight, of the total of (1), (2) and (4); (5) a volatile solvent for the ingredients of (1), (2) and (4), e.g., ethylene dichloride, a mixture of ethyl alcohol and 1-nitropropane, a mixture of ethyl alcohol and toluene, etc.; and (6) an inhibitor such as quinone or hydroquinone in an amount of approximately .001 percent to .01 percent of the weight of the reactive materials of (1) and (2). The amount of solvent to be used is betwen 5 and 20, preferably 10, times the amount of the polyvinyl formal resin in the composition.

Once the apparatus is adjusted by properly locating the control roller 36, the dies 40, 42 the speed, and number of pairs of lamps 64-62, 78-80, the glass fiber filaments are stripped in continuous lengths from the creels and traverse substantially the same directions, are exposed to the same number of coatings and temperatures and the line of travel is sufficiently defined, so that the product which is wound up on the windup reel is in the direction of the arrow 92 (FIGURE 2) will produce a product of a uniform resin to fiber glass ratio, and resin weight and thereby possess the desired electrical properties and other physical properties including tensile strength, etc.

The operation, once it is initiated, will continue without interruption and is substantially trouble-free to continuously produce the finished tape material. The only adjustments that are required, are those which might arise from a slight variation from time to time of the solvent content for the resin, this being adjusted by varying the heating elements of the resin to vary the viscosity. The operator is aware of the conditions within the heating chamber by taking readings of temperature provided by the thermocouple 122 located in stack 124 having a damper 126 this providing valuable information for controlling the rate of speed, tension, etc.

Although the present invention has been illustrated and described, in connection with single example embodiment, it will be understood that this is exemplary of the invention and is by no means restrictive thereof. It is reasonably to be expected that those skilled in this art can make numerous revisions and adaptations of the invention to suit individual design requirements and it is intended that such revisions and adaptations which incorporate the herein disclosed principles will be included within the scope of the following claims.

I claim:

1. A process for producing insulation tape having a substantial tensile strength and of uniform physical properties throughout its length, comprising: gathering a plurality of rovings from individual creels and aligning them through a comb in side-by-side parallel relation; passing the parallel rovings back-and-forth through a heating chamber enclosure; radiating a heating effect upon each of opposite sides of the rovings as they pass back-and-forth within said heating chamber between the ends thereof to uniformly heat each of the opposite sides of the tape formed by said gathered rovings; dipping the rovings as they move within said chamber through a quantity of liquid phase heat-hardenable resin and thereafter passing the coated rovings through an orifice of fixed dimensions after each such dipping; said orifice-defining means being floatably mounted whereby it will automatically adjust to the line of movement of the coated rovings and follow such movement without fraying or breaking the said rovings passing therethrough; at least partially curing the resin in preparation for at least one additional subsequent dip coating and sizing during a given cycle of back-and-forth movement within said chamber; and thereafter winding up the substantially solventless tape product subsequently to its passage through the heating chamber.

2. The process in accordance with claim 1 including the step of passing said tape over the periphery of rotatable members disposed at the opposite ends of said chamber to effect said back-and-forth movement within the heating chamber.

3. The process in accordance with claim 1 including the step of guiding said plurality of rovings both laterally and horizontally so that its line of movement substantially registers with the orifice.

References Cited by the Examiner

UNITED STATES PATENTS

| 2,008,439 | 7/35 | Ensign et al. | 226—109 XR |
| 3,042,569 | 7/62 | Paul | 156—166 |

FOREIGN PATENTS

| 793,247 | 4/58 | Great Britain. |

EARL M. BERGERT, *Primary Examiner.*